Nov. 18, 1930.  F. A. TREIBER  1,782,393
ANTIGLARE DEVICE
Filed June 21, 1930   2 Sheets-Sheet 1
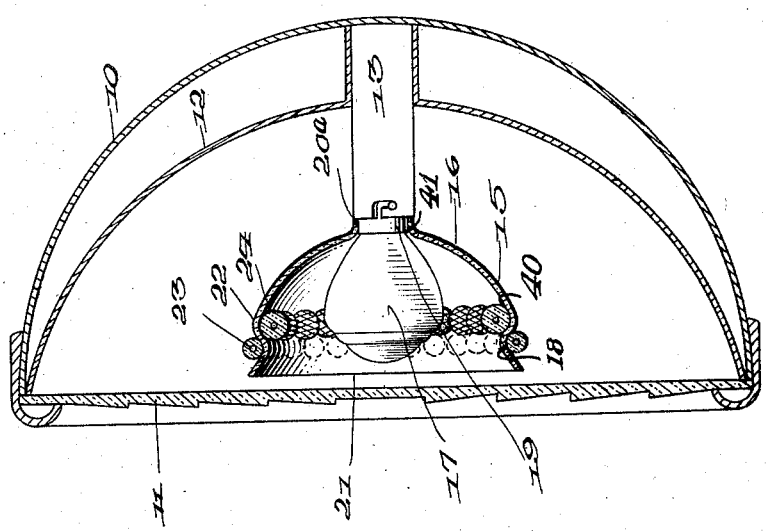
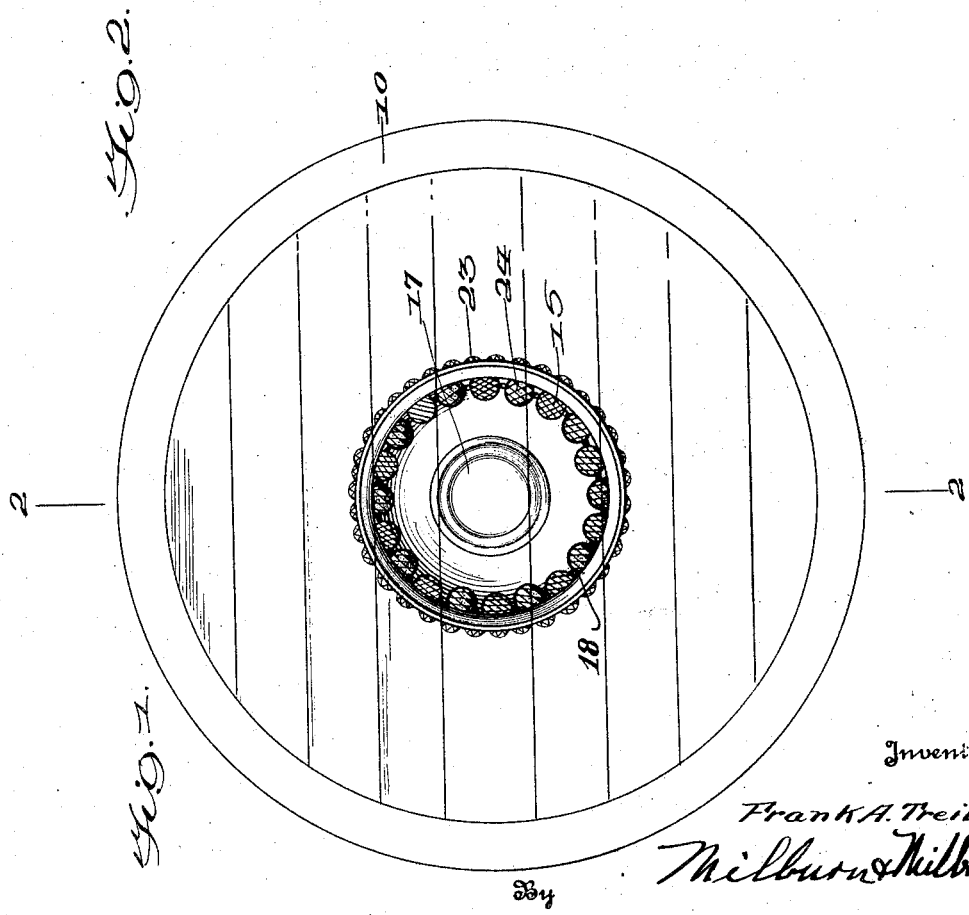

Nov. 18, 1930.　　　F. A. TREIBER　　　1,782,393
ANTIGLARE DEVICE
Filed June 21, 1930　　2 Sheets-Sheet 2
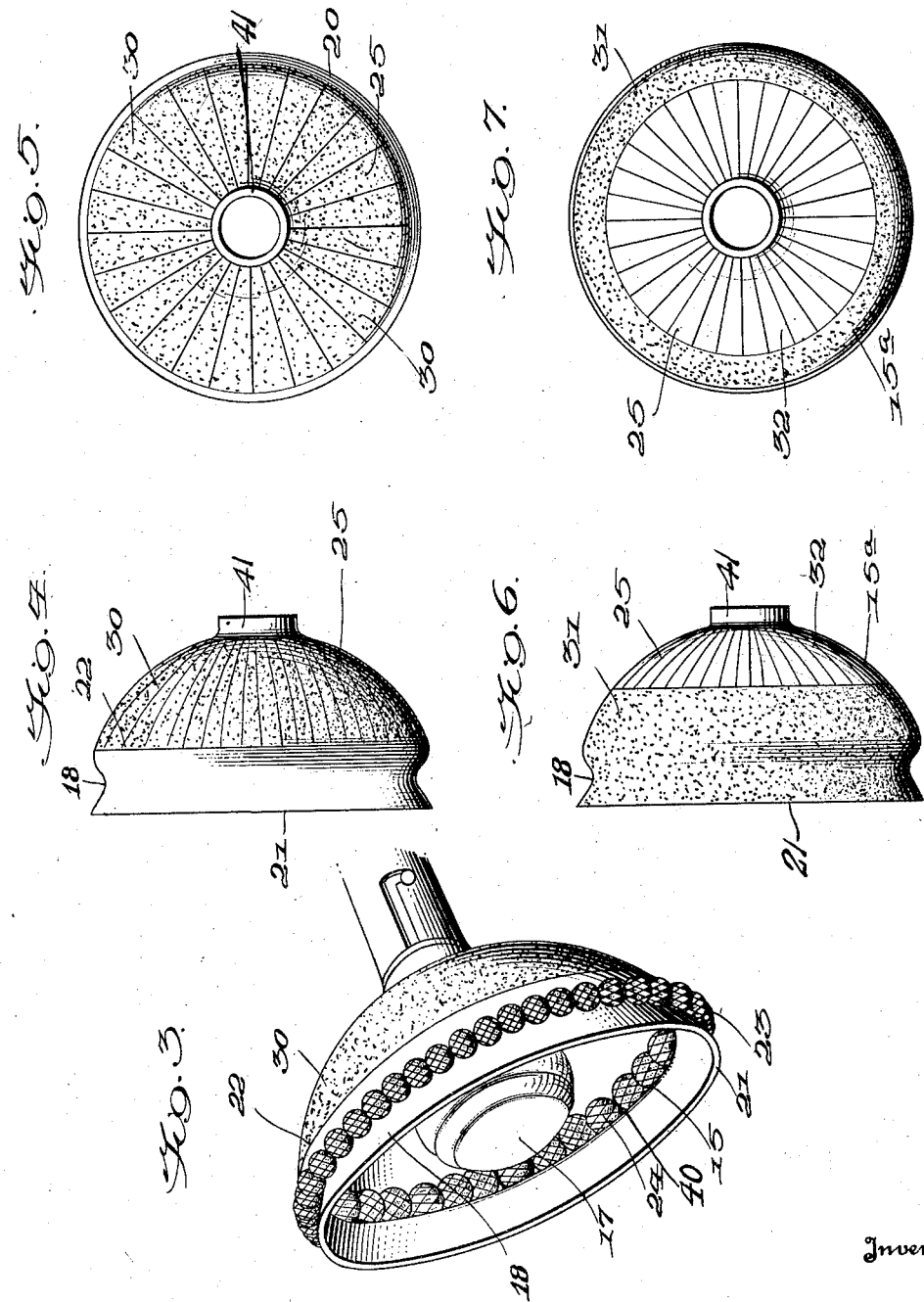

Patented Nov. 18, 1930

1,782,393

UNITED STATES PATENT OFFICE

FRANK A. TREIBER, OF CUMBERLAND, MARYLAND

ANTIGLARE DEVICE

Application filed June 21, 1930. Serial No. 462,900.

The present invention relates to an antiglare device particularly adapted for use on automobiles.

Automobile headlights in use at the present time are not altogether satisfactory because, in order to project sufficient light to illuminate the road the required legal distance in advance of the automobile, they must project rays of such strength that they will be extremely bright and glaring. In an attempt to overcome this difficulty, the general practice is to provide lenses or screening means of such conformation that the brighter rays of the headlight will be projected downwardly upon the surface of the road, so that they will not shine directly into the eyes of pedestrians or approaching drivers. However, this practice does not remedy the difficulty to any considerable extent, since the headlights of cars meeting at the brow of a hill shine directly into the eyes of the respective drivers, and any irregularity in the surface of the road which throws the forward end of the car upwardly to any extent likewise causes the brighter rays of the headlight to be projected upwardly at an unsafe angle.

The principal object of the present invention is to provide a device which may be attached to automobile headlights or any other light projector and which will soften the rays projected from the light without in any degree diminishing their illuminating qualities.

Another object of my invention is to provide a device of the type indicated which will impart an effect of lunar whiteness to the rays projected from the headlight and which will give perfect diffusion of the projected rays.

A still further object of the invention is to provide an anti-glare device which may be applied to any headlight bulb of the usual construction and which may be used with or without any of the standard headlight lenses.

Another object of the invention is to provide a device of this type which may be very readily and economically manufactured and which may be sold at a very reasonable cost.

Other objects and advantages of my invention will be apparent from the following specification and annexed drawings. In the drawings, Figure 1 is a front view of my anti-glare device attached to an automobile headlight;

Figure 2 is a vertical sectional view taken on the line 2—2 of Figure 1;

Figure 3 is a perspective view of the device showing it attached on the headlight bulb socket;

Figure 4 is a side elevation of the screen or shield used as part of my device;

Figure 5 is a rear view of the screen shown in Figure 4;

Figure 6 shows a side elevation of a modified form of a screen or shield which may be used in my device; and Figure 7 is a rear view of the screen shown in Figure 6.

The numeral 10 designates an automobile headlight provided with a lens 11, reflector 12, and bayonet slot bulb socket 13, all of the usual construction.

Referring to the form of my invention shown in Figs. 1 to 5, inclusive, my anti-glare device is generally indicated by the numeral 15 and includes a screen or shield member 16 which is preferably cup shaped and formed of glass. The screen or shield member 16 is fitted about the usual headlight bulb 17 and has a relatively short collar portion which is positioned about and extends along the base 19 of the headlight bulb. A washer 20ª of felt or other resilient material is preferably interposed between the rear edge of the collar 41 and the forward edge of the bulb socket 13, and it will be seen that by this arrangement the screen 16 is clamped in position on the bulb when the bulb is attached to the socket 13.

An inwardly projecting ridge or shoulder 18 is formed about the screen 16 closely adjacent its forward edge 21 for a purpose hereinafter set forth, and the form of screen illustrated in Figs. 1 to 5 is frosted as at 30 (see Figs. 3, 4, and 5) from its rear edge or central portion to the innermost edge 22 of the inwardly projecting shoulder 18.

The numeral 23 designates a row of refractive elements strung upon a wire and positioned about the outside of the screen 16 in the depression formed by the inwardly projecting shoulder 18. A second row of refractive elements 24 is positioned on the inside of the screen 16 behind the shoulder 18, the shoulder 18 and the concave shape of the screen 16 forming a groove 40. The rows of refractive elements 23 and 24 may be colored, amber or green being desirable tints, or crystal elements may be used. It is also desirable to have a tint in the glass of the screen 16, pale rose being a very satisfactory tint for this purpose.

Instead of being perfectly round and smooth, it is found preferable to form at least one surface of the central portion of the screen 16 of extremely narrow flattened portions 25 radiating from the center of the screen, the whole giving that surface of the screen the appearance of being provided with radiating lines. This arrangement is best illustrated in Figs. 4 and 5.

In the use of my anti-glare device, the rays of light which are projected to the rear by the bulb 17 will be softened by passage through the frosted portion 30 of the screen 16. The tint preferably incorporated in the screen will increase the softening effect, and the radiating flat portions of one surface of the screen will tend to diffuse the rays. It is obvious that rays reflected back upon the frosted portion 30 of the screen 16 by the reflector 12 will be further softened and diffused. Rays passing directly from the bulb to the refractive elements 23 and 24 will be broken up by these elements and will be projected at various angles, some into the reflector 12 and some to the outside of the projector 10. Some of the rays originally directed from the bulb to the reflector will also pass into the refractive elements and will be broken up. The breaking up of these rays by the elements 23 and 24 results in eliminating the extremely bright rays and the softening and diffusing of the rays projected from the headlight. Some of the rays will be projected outside of the area to which automobile headlight rays are generally projected, but none of these rays will be blinding, and because they will illuminate a wider area than is generally the case, the automobile driver will be considerably assisted.

If either or both the screen 16 and the refractive elements, or a certain number of the latter elements are tinted in the manner suggested, the beam projected will have an effect of lunar whiteness because of the slightly tinted rays which will be scattered throughout the entire beam.

It is customary to form headlight bulbs so that a minimum number of rays will be projected forwardly from the bulb, and I find in actual practice that the few light rays which are projected directly forward from the bulb are not sufficient in number or sufficiently bright to annoy or blind approaching drivers.

The shield 15$^a$, illustrated in Figs. 6 and 7, is identical with that used in the device of Figs. 1 to 5, inclusive, except that the shield 15$^a$ is translucent or frosted at its outer or forward edge 31, the central portion 32 of shield 15$^a$ preferably being clear. The screen 15$^a$ will be fitted with refractive elements in the same manner as the shield 16. The light beam projected from the Fig. 6 device is slightly brighter at its central portion than that resulting from the use of the shield 16. However, the beam cast from the shield 15$^a$ is not so bright as to be blinding, this effect effect being partially due to the diffusion brought about by the radially arranged flattened surfaces 25.

The shield or screen used in my device may be of varying sizes, according to the size of the lens or bulb with which it is used. The screen may be colorless or tinted as desired, light rose, light green, or crystal giving the best results. The refractive elements may also be of varying sizes to accompany the different sizes of bulbs and/or lenses with which the device may be used.

I claim:

1. The combination with a light projector including a source of light, of a partially translucent shield fitted about said source and having an annular shoulder about its forward portion and an annular refractive device surrounding said shoulder.

2. The combination with a light projector including a source of light, of a cup-shaped shield fitted about said source, said shield having a groove about its forward portion and refractive elements supported within and behind the groove about said shield.

3. The combination with a light projector including a source of light and a reflector, of a shield between the light source and the reflector, said shield having a shoulder about its forward portion, a refractive device mounted to surround said shoulder, and said shield having a light modifying band thereabout, the band and device being so arranged that light rays passing from the light source to the reflector will be modified by said band or said device.

4. The combination with a light projector including a source of light and a reflector, of a shield between the light source and the reflector, said shield having a plurality of grooves about its forward portion and refractive elements fitted in the grooves on the interior and exterior of said shield.

5. An anti-glare device comprising a cup-shaped member having shoulders about its forward portion, a strand of refractive beads mounted between the shoulders and a light modifying band about said member to the rear of said shoulders.

FRANK A. TREIBER.